United States Patent
Mooney et al.

(10) Patent No.: US 6,939,389 B2
(45) Date of Patent: Sep. 6, 2005

(54) METHOD AND APPARATUS FOR MANUFACTURING FINE POWDERS

(76) Inventors: Frank Mooney, 9 Flintlock Dr., Danbury, CT (US) 06811; Fay Nelson, 124 Great Plain Rd., Danbury, CT (US) 06811

( * ) Notice: Subject to any disclaimer, the term of this patent is extended or adjusted under 35 U.S.C. 154(b) by 192 days.

(21) Appl. No.: 10/637,828

(22) Filed: Aug. 8, 2003

(65) Prior Publication Data

US 2005/0028642 A1 Feb. 10, 2005

(51) Int. Cl.$^7$ ................................................ B23F 9/04
(52) U.S. Cl. ........................ 75/346; 75/352; 75/354; 75/360; 264/3.4; 264/414; 264/423
(58) Field of Search ................ 75/346, 352, 354, 75/360; 264/3.4, 414, 423

(56) References Cited

U.S. PATENT DOCUMENTS

| | | | | |
|---|---|---|---|---|
| 3,302,892 A | * | 2/1967 | Nilsson | 75/354 |
| 3,854,896 A | * | 12/1974 | Switzer et al. | 48/210 |
| 4,238,430 A | * | 12/1980 | Phillips | 264/15 |
| 4,313,737 A | * | 2/1982 | Massey et al. | 241/1 |
| 4,406,700 A | * | 9/1983 | Maeland | 148/403 |
| 4,501,717 A | * | 2/1985 | Tsukamoto et al. | 419/58 |
| 5,756,928 A | * | 5/1998 | Ito et al. | 149/7 |
| 6,168,644 B1 | * | 1/2001 | Fukasawa et al. | 75/343 |

* cited by examiner

Primary Examiner—George Wyszomierski

(57) ABSTRACT

The manufacture of pure, fine spherical powders has always been a problem for many materials, particularly for high-melting and highly reactive materials such as titanium, tantalum, vanadium and zirconium. The present invention provides a process and apparatus for producing such powders by rapidly heating course powders containing a gas or gases to near or above their melting point, whereby the contained gas erupts explosively to form many fine particles of the host material. The fine particles are typically, but not necessarily spheroidal, depending upon the process conditions at the time of eruption and immediately thereafter. Methods are described for producing, collecting, handling, storing and passivating said fine powders.

42 Claims, 6 Drawing Sheets

Powder Particles After Plasma Melting

Hydrogen-Containing Powder Particle Prior To Plasma Melting

Figure 1A.

Powder Particles After Plasma Melting

Figure 1B.

Non-Transferred-Arc PlasmaTorch

Figure 2.

Induction Plasma Torch

Figure 3.

Plasma Reactor System

Figure 4.

Stainless Steel Collection Pot

Figure 5.

METHOD AND APPARATUS FOR MANUFACTURING FINE POWDERS

CROSS-REFERENCE TO RELATED APPLICATIONS

Not Applicable

STATEMENT OF FEDERALLY FUNDED RESEARCH OR DEVELOPMENT

Not Applicable

REFERENCE TO MICROFICHE APPENDIX

Not Applicable

BACKGROUND OF THE INVENTION

The present invention relates to the field of powder materials, and more specifically to the making of fine powders. For the purpose of this description some non-limiting examples of fine powders may include those classified as fine, ultrafine, nanofine; etc.

Powders are being used increasingly in a variety of applications. Some non limiting examples of those applications include molded parts, coatings, printing inks, pigments, and electrical media. Generally speaking, the finer the size of the powder the better the resulting properties and/or manufacturing results. Fine powders or particles perform better than coarse powders or particles because:
a. Fine powders have more surface area and, thus, more energy per unit of weight.
b. Fine powders absorb electrical and magnetic energy better than coarse powders.
c Molded parts made from fine powders reach higher densities during compaction and/or heating, and require much less time and, therefore, energy to do so. Higher density results in better mechanical properties;
d. Molded parts made from fine powders have smaller grain size after compaction and/or heating, which also results in better mechanical properties; and molded parts made from fine powders have smoother surfaces and better surface detail.

It has been found that, fine powders are not always easily or commercially available. It has also been found that fine powders are expensive due to the complexity or labor intensive manufacturing methods. And, in many cases, the available fine powders are impure because of contamination that occurs during processing, for example grinding.

Spherical, fine powders are even more desirable than other shapes for many applications noted above. In addition to the advantages listed above for fine powders, fine spherical powders flow and pack better than non-spherical powders, and in the case of injection molding processes, fine spherical powder is optimal for achieving the paste properties needed for properly molding parts. However, sphericity typically occurs only when coarse feed powders or particles are heated above their melting points and then are allowed to solidify without contacting other matter with which the particles will react or interact. These conditions are difficult to meet, particularly for materials with high melting points, or which are extremely reactive in their molten states. As a result, fine spherical powders generally are not available on a commercial basis for many materials.

While conventions for describing powders by size have not been rigorously defined, powders typically are considered "coarse" if they are greater than 45 micrometers in diameter, "fine" if they are greater than 20 and less than 45 micrometers in diameter, "ultra fine" if they are less than 20 and greater than 1 micrometers in diameter, and "nanofine" if they are less than 1 micrometer in diameter. For the purposes of this application, the word "fine" is used to mean fine, ultra fine, and nano powders as described except when context requires, and use of quotations around a description of powder by size indicates, otherwise.

BRIEF SUMMARY OF THE INVENTION

We have discovered a method for producing fine powders from coarser feed powders. The coarse feed powders should be gas enriched meaning that they have a composition of or contain material that will interact with or in any way entrap gas. These gas-enriched coarse feed powders are quickly heated to temperatures close to or above their melting temperatures. As the gas-enriched powders are heated to temperatures close to or above their melting temperatures, the gas expands and is eventually released explosively. The explosive release of gas shatters the gas-enriched powders into many fine particles or powders. When the release occurs above the melting point of the matter, spheres of liquid matter are formed which retain their spherical shape on solidification. Even if the particles shatter below the melting point of the material, the finer particles that result may still reach their melting point and become spherical.

We have also found that the heating rate influences the size of the resultant fine particles. The faster the gas-enriched feed powders are heated to the point where the gas is released explosively, the more violent is the shattering by the explosion of the gas and the smaller and more numerous the resulting fine particles. We have also noted that coarser gas-enriched feed powders yield larger-diameter fine powders, apparently because the larger particles have more mass and thus are naturally heated more slowly in the above-described process. Still further, we have found that the amount of entrapped gas has a significant effect on the size of the resultant fine powder. More gas results in smaller particles. It is to be noted that we also believe that the type of gas and the molecular makeup of the entrapped gas may also be important.

We have further found that we can safely and efficiently produce, collect, store, and handle these fine powders by means of a series of interconnected devices, including a powder feeder, a plasma torch, a reaction chamber, and a detachable collection pot. These can, by means of gas-fight design in combination with controlling one or all of the following: atmosphere, temperature, and content control, protect the fine particles from oxidation, and arrest the potentials of said fine powders to ignite or explode; and still further, we can prepare said fine powders for handling in specific production processes by means of coating them with matter that will, with or without chemical reaction, retard the potentials of said solidified fine powders to react excessively with oxygen or other contaminants or to ignite or explode, and to do so without contaminating the fine powders in any way that would limit their utility as raw material in specific manufacturing processes.

DETAILED DESCRIPTION OF THE INVENTION

Figure 1A:
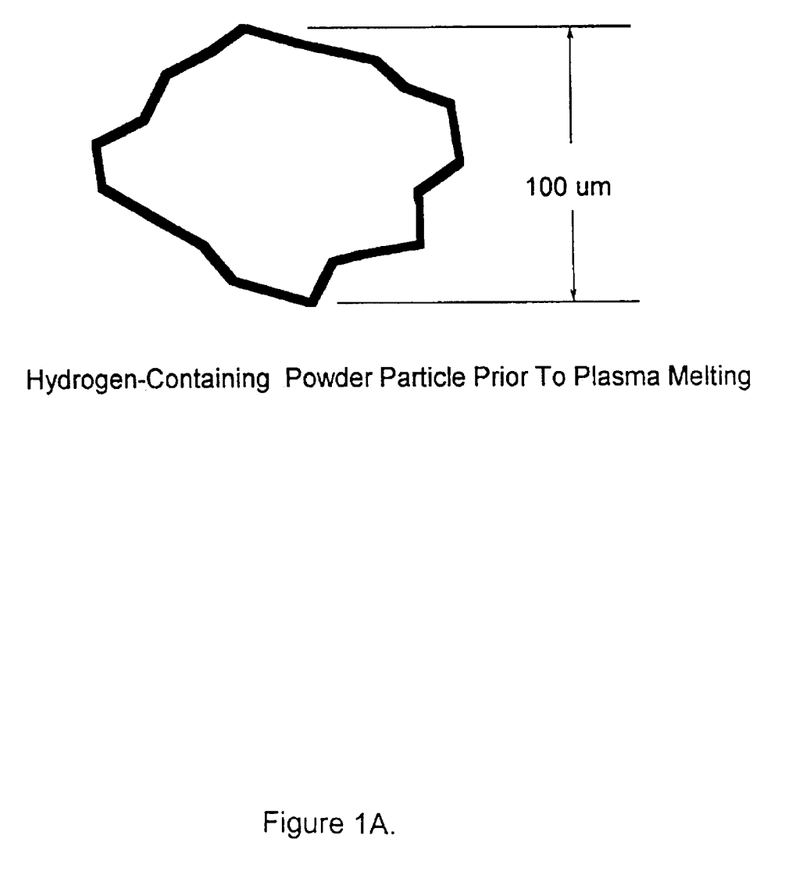
FIG. 1A represents the transformation of the heated, gas-enriched coarse feed powders that have entrapped gases therein.
Figure 4:
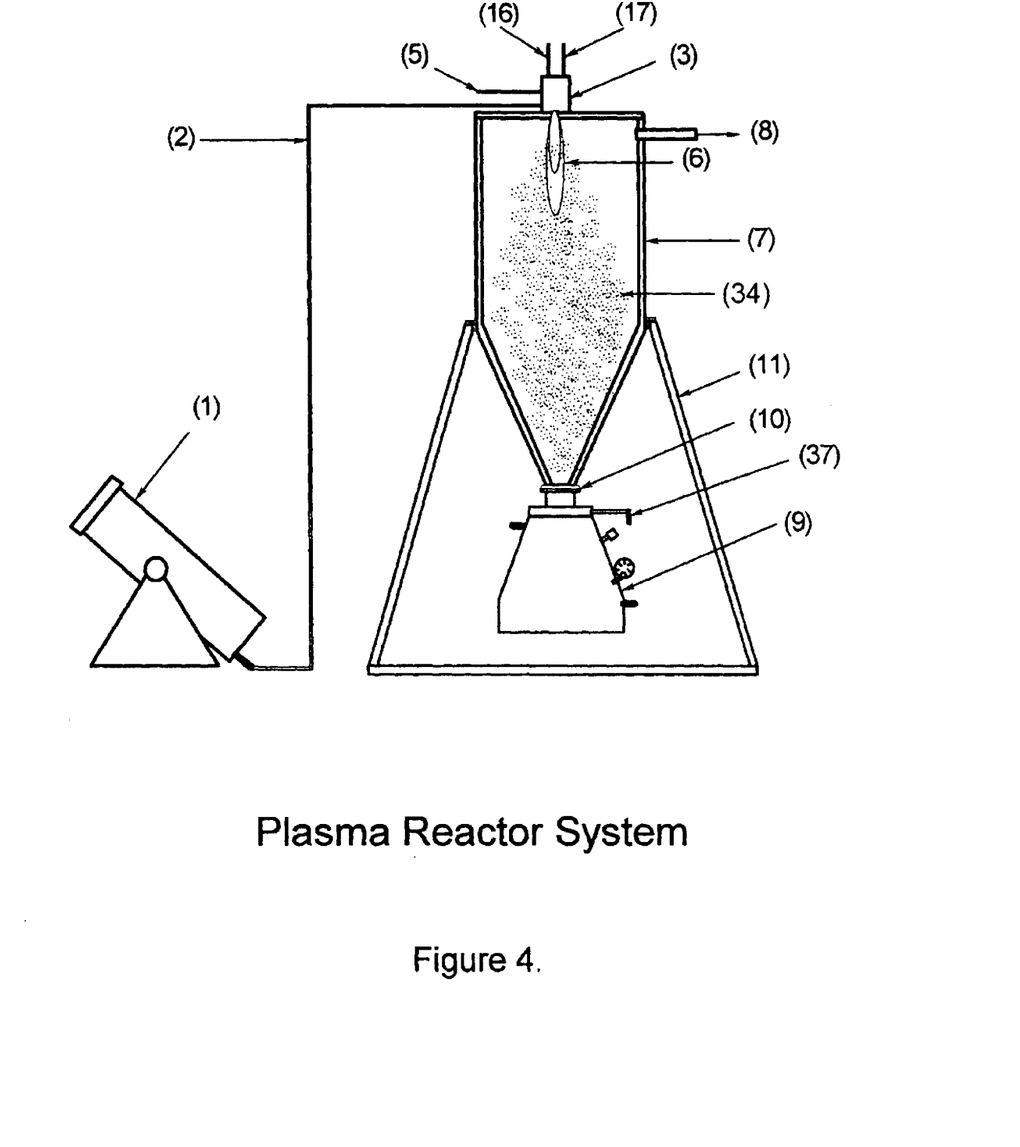
FIG. 4 represents the assembled apparatus for producing fine powders according to this invention.

Referring to the FIG. 4 of the drawings, coarse feed powders 2 enriched with a selected gas are fed into a high-temperature heat source generally identified as 3 using commercially available feeder devices 1 known to those familiar with the art. The gas-enriched feed powders 2 are heated rapidly to near or above their melting point. As they approach their melting temperatures, the entrapped gas erupts violently from within the feed powder 2 and creates many smaller fine powders or particles, which then rapidly cool and solidify into fine solid particles as they exit the flame. These powders or particles are depicted schematically in FIGS. 1A and 1B. The fine powders thus produced are collected and handled in a protective atmosphere and are then passivated, if necessary to permit handling in air, by methods to be described, as well as those known to those familiar with the art.

The following discussion of the details of our invention is divided into sections on a) feed powders, b) rapid heating and containerless melting, c) apparatus, and d) protection and handling. These are discussed separately.

(a) Feed Powders

The feed powders 2 that contain the selected entrapped gas are obtained from materials and processes known to those familiar with the art. Any particulate matter that can entrap or hold modest amounts of gas can be used as the raw material. Titanium, tantalum, zirconium, vanadium, their alloys, and other metals containing even minor amounts of these gas-enriched metals, are some typical non-limiting examples. However, the particles 2 may also include ceramic, metallic, intermetallic, or organic materials such as plastics. The gas contained within the starting powders 2 is defined by and will vary with the chemical properties of the material being processed. In the examples described later in this application, the enrichment gas used is hydrogen, and the material enriched with hydrogen is titanium.

Rapid Heating and Containerless Melting

Still referring to FIG. 4, the gas-enriched powders 2 must be melted by means of a heat source 3 that can rapidly elevate their temperatures close to or above their melting temperatures without restricting the gas from being released explosively, or preventing the gas from shattering the gas-enriched particles 2 into many finer particles or powder 20. Preferably, the rapid heating is accomplished by means that do not bring the heated feed powder or the fine product powder into contact with any other materials other than the entraining gas, or gases until substantial cooling has occurred. We term this "containerless melting", and it insures that the heated powders are not contaminated.

Means known to the inventors for rapidly heating the gas-enriched particles close to or above their melting temperatures include, but are not restricted to Laser and electron beams, and arc or induction plasmas. Of these, the plasmas are the preferred means because they allow straightforward and economical implementation of the containerless melting concept. The induction plasma is the most preferred because of its efficiency and economy.

High-temperature plasmas are an especially effective and practical heat source because:

1. A plasma is an ionized gas, which can generate temperatures as hot as the surface of the sun. Commercial high-temperature plasmas are typically above 10,000° C. at their core. Thus they can heat all gas-enriched coarse powders very rapidly, to near and above their melting temperatures.
2. Plasmas are generated from pure gases so argon or helium can be used and these are two of the few gases that will not react with any other matter.
3. Commercial plasma torches are readily available. These torches are designed to melt powders in the range of 500 micrometers down to under 45 micrometers.
4. The plasma torch design allows implementation of containerless melting.
5. The rapid cooling of the hot particles downstream of the plasma flame because of their high velocity) prevents unwanted interactions with the gases and other particles within the reaction chamber. It also allows the compact design of the chamber.

Figure 1B:
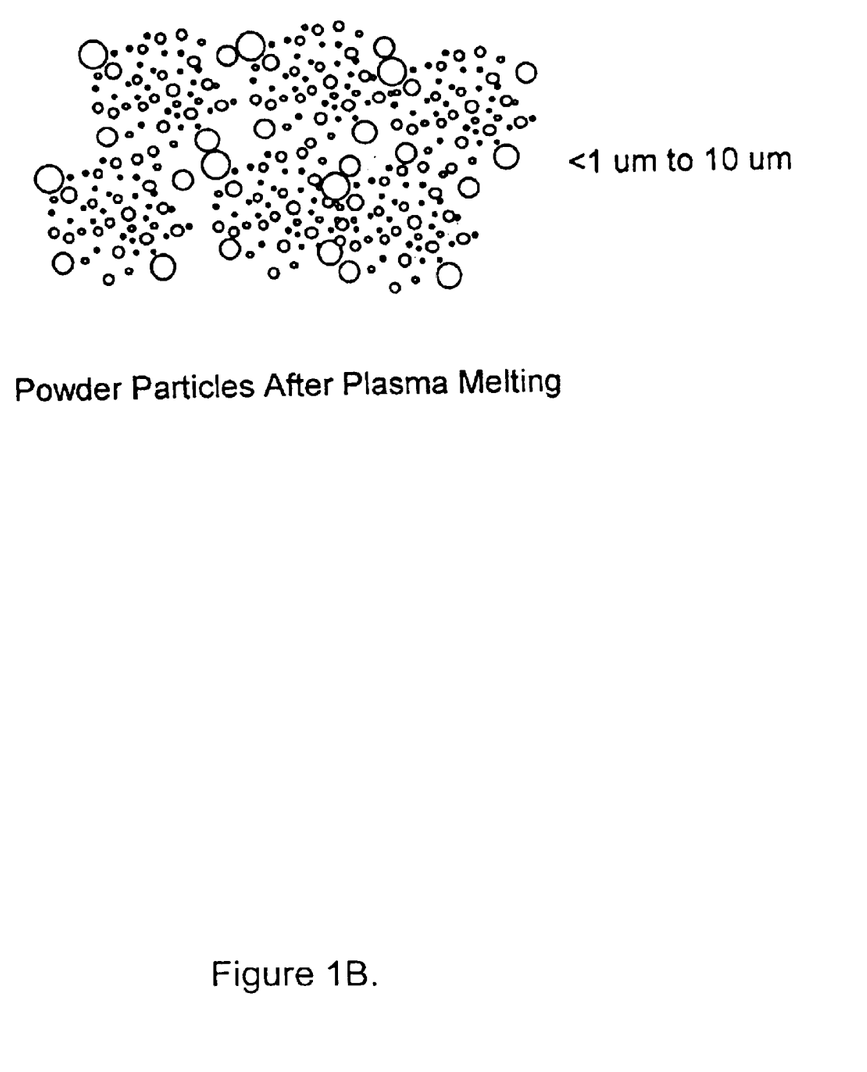
FIG. 1B represents the fine particles after heating according to this invention.
Figure 2:
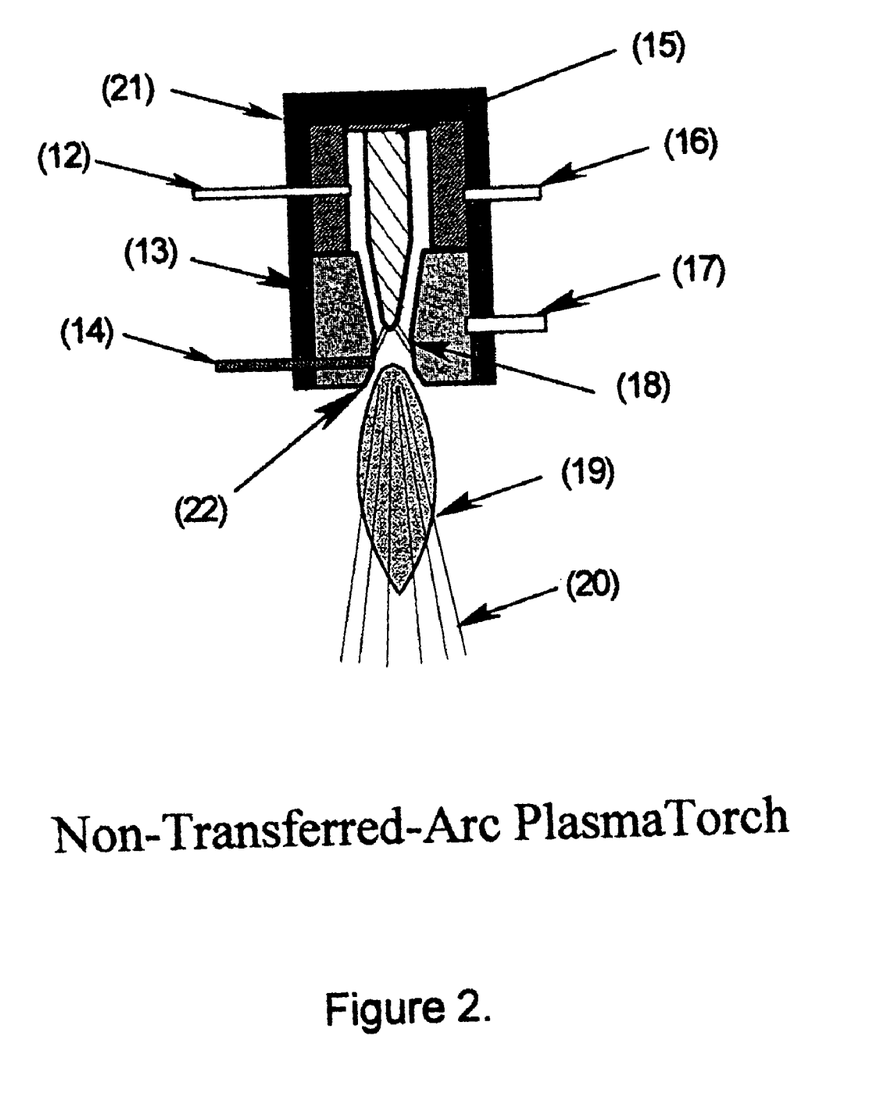
FIG. 2 represents one example of an arc plasma torch used for heating gas-enriched powder according to this invention.
Figure 3:
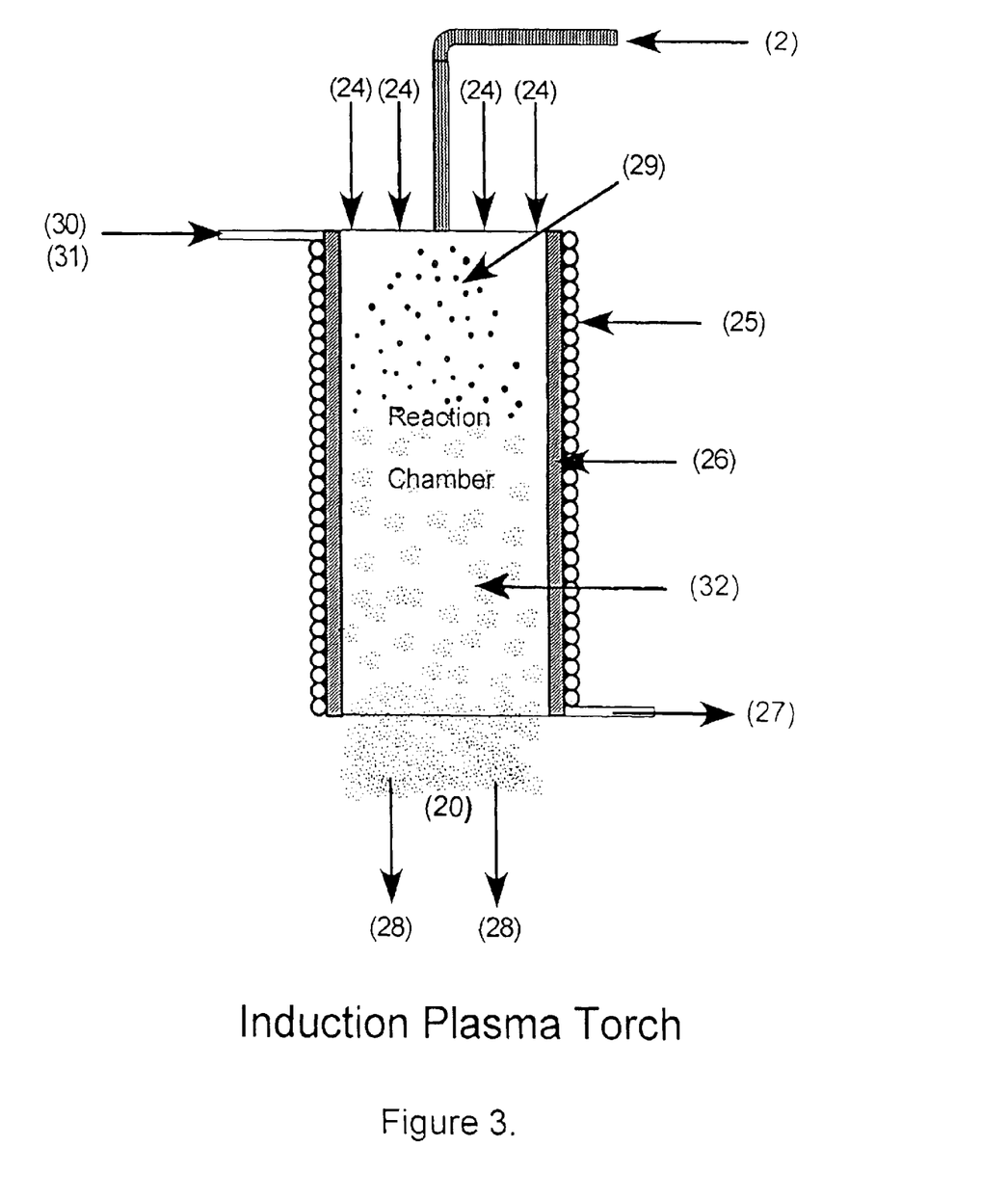
FIG. 3 represents one example an induction plasma torch used for heating gas-enriched powder according to this invention.

A heat source 3 such as a non-transferred-arc plasma torch or an induction plasma torch are shown in FIGS. 2 and 3, respectively. The non-transferred-arc plasma torch seen in FIG. 2, was used in the later described examples or experiments for convenience. The non-transferred-arc plasma torch shown in FIG. 2 consists of a tungsten electrode 15 and a nozzle-shaped copper electrode 13 separated by, and contained in a nonconductive body 21 that allows for water cooling to dissipate the generated heat, and which permits the feed powder 2 in the feed line 14 to be injected into the plasma flame 19. Electrical power and cooling water are brought to the torch 3 through suitable electrical connections 16 and cooling water connection 17. The plasma gas is fed through the gas port 12 and conducted to and towards the high-intensity electrical arc 18 struck between the two electrodes 13 and 15 generating the plasma, which is an ionized gas. The plasma flame 19 exits through the copper nozzle orifice 22 at a high velocity, sometimes approaching or exceeding the speed of sound. The feed powder 14 is injected downstream of the electrical arc 18 and is carried along with the plasma flame 19. The high temperature of the plasma flame 19 rapidly heats the feed powder 2 close to or above its melting point, whereupon the entrapped gas is expelled explosively and the coarse particle 2 seen more clearly in FIG. 1A; is shattered into many smaller fragments of fine powder 20, as depicted in FIG. 1B. The fine powder fragments 20 may or may not become spheres, depending on the conditions. The high velocity of the plasma gas results in rapid cooling and solidification of the fine powder particles 20 downstream of the reaction zone or chamber 7, more clearly seen in FIG. 3.

One non-limiting example of an induction plasma torch is shown schematically in FIG. 3, and at this time is considered a preferred heat source. This induction plasma torch uses a high-frequency (RF) induction current 30 to generate the plasma, rather than an electrical arc. Here the plasma is generated by the (RF) current passing through a coil 25 formed by copper tubing 27 that is wrapped around a non-conducting ceramic cylinder 26 containing a flowing stream of argon or other gas or gases 24. The induced electrical current is strong enough to ionize the gases inside the ceramic cylinder 26, thus forming the plasma 29, while water 31 flowing through the copper tubing 27 cools the copper coil 25 and the ceramic cylinder 26. The coarse feed powder 2 is feed or injected into the annulus and is rapidly heated by the high-temperature plasma. The fragmented particles 20 are carried out of the reactor along with the downstream plasma gases 28.

The induction plasma torch FIG. 3, can have a much larger hot zone when compared to the arc plasma FIG. 2. The induction plasma torch FIG. 2, has an additional advantage by allowing the plasma gas 24 to travel through at a slower velocity. This allows more time for heating particles, and permits the gas-enriched feed particles 2 to reach or exceed their melting points. Particles as large as 500 micrometers can be melted in an induction plasma torch FIG. 3, as compared with about 100 micrometers using an arc plasma FIG. 2. A further advantage of the induction plasma FIG. 3, is its capability of feeding the feed powder 2 to be processed co-axially with the plasma gas 24, since no electrode is involved. This allows for better injection of the feed powder or material 2 into the hot core or zone 32 of the plasma, which promotes more uniform and efficient melting.

Either of the above plasma means provide containerless melting, since the feed powder is suspended in flowing argon gas at the point of injection into the hot plasma, and continues to be suspended during its subsequent downstream transformation, solidification and cooling. Thus there is no opportunity for unwanted contamination during the conversion to fine powder. In fact, during the melting, some impurities are usually expelled from the molten liquid and carried away in the argon gas stream, along with the expelled gas or gases.

(c) Apparatus

From the above discussion, it is apparent that the fine powders that result from the explosive release of the entrapped gas must be contained by means of an apparatus in which the fine powders 20 can solidify without contact with the walls of the chamber, without agglomerating, and without being contaminated by other matter in the atmosphere within the apparatus or by the matter out of which the apparatus is made. This is particularly important for fine powders 20, which are typically reactive with air and moisture. In addition, molten titanium, zirconium, tantalum, and vanadium are reactive with most solids and their powders are also reactive with gases such as nitrogen and hydrogen.

In carrying out the concepts of this invention, a plasma reactor system 34 was configured as shown in FIG. 4. The major components are the powder feeder 1, the plasma torch 3, the reaction chamber 7, and the collection pot 9. They are each constructed to be gas tight, and are interconnected by gas-tight seals by means known to those skilled in the art. The entire system 34 is vented to a dust collection means 8 that is regulated to handle the effluent argon from the reactor, but not to pull a vacuum on the system. Suitable commercial dust collection devices 8 are readily available and are known to those familiar with the art, as are powder feeders 1. The reaction chamber 7 is water jacketed to allow it to withstand the great amount of heat generated by the plasma. It also is designed to ensure the particle stream does not impinge upon any surface until it is sufficiently cool that there will be no interaction or contamination. A steel frame 11 supports the reaction chamber 7.

Prior to operating the system 34, all components are flushed thoroughly with pure argon to remove any traces of air, moisture, or gases that could react detrimentally with the fine product. The coarse gas-containing powder 2 is placed in the powder feeder 1 and uniformly entrained in flowing argon and conveyed through the powder feed line 14 to the heat source, a non-transferred-arc plasma torch FIG. 2. The plasma torch 3 is attached to the water-jacketed stainless steel reaction chamber 7. Electrical power and cooling water are carried to and from the torch 3 by common hoses and connections 16 and 17. The argon plasma gas enters at a gas port 12. Upon injection into the plasma torch 3, the feed powder 2 is heated rapidly to its melting point, as shown in detail in FIG. 2, and discussed earlier. Down stream of the arc, the plasma gas and the hot feed powder enter the reaction chamber 7 together at or near the top 6 of the chamber 7. The shattered or reacted fine powder 20 travels to the bottom of the chamber 7 while the hot gases and any dust and impurities are vented to the dust collection means 8 such as a dust collector.

The solidified fine powder 20 finally comes to rest in the detachable collection pot 9 that is connected to the bottom of the reaction chamber 7 by means of a gastight seal and quick disconnect flange assembly 10. The collection pot 9 is disconnected while maintaining the purity of its atmosphere by closing the valve 37 and removing the quick connect lock-ring of the flange assembly 10 which holds the flange/o-ring combination to the mating flange of the reaction chamber 7. A flat stainless steel plate (not shown) is placed against the flange and O-ring of the collection pot 9 and is held in place by the lock-ring not shown), as was the reaction chamber flange before it. This arrangement provides an excellent seal.

(d) Protection and Handling

Figure 5:
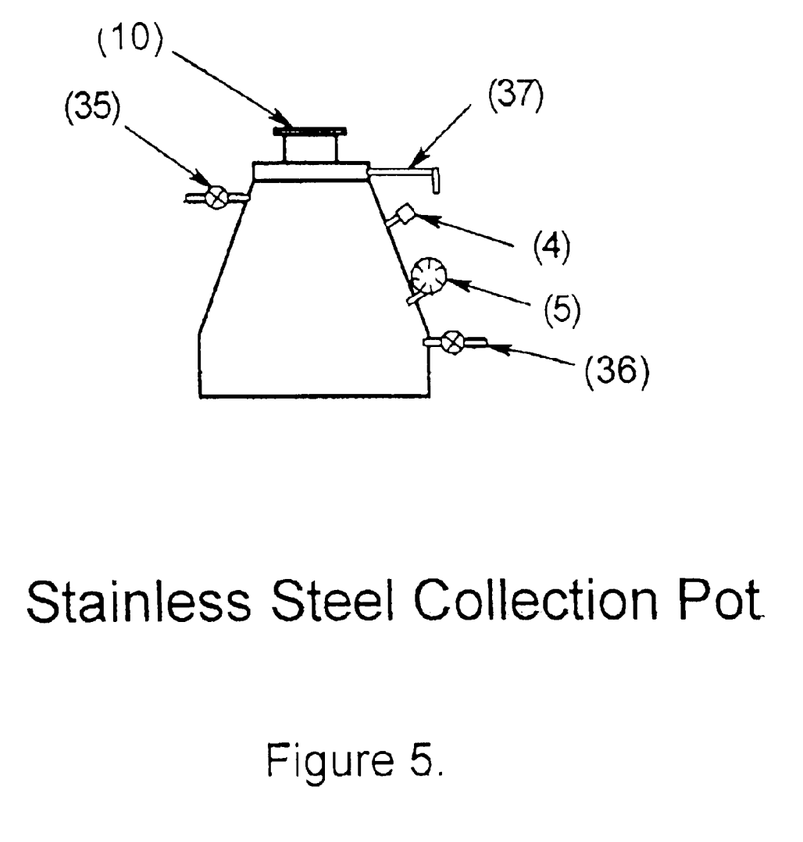
FIG. 5 represents one example of a collection vessel for protecting and storing the fine powders produced according to this invention.

Some fine powders 20 generate heat when reacting with oxygen, and can be flammable or even explosive when allowed to contact oxygen-containing substances, such as air or water. The collection pot 9 serves as a storage, handling, and/or shipping vessel, which can hold a pure, protective atmosphere around the fine powder 20 indefinitely. It is made of stainless steel, and consists of a connection flange with an O-ring seal 10, a butterfly valve 37, a pressure relief valve 4, and pressure gauge 5, and gas inlet 35, and outlet 36. The collection pot 9 also was designed to allow gas to be added as needed during subsequent processing operations. The valve 37 allows the collection pot 9 to be sealed as it is being removed from the reaction chamber 7 or alternatively as it is being attached to another device, such as a glove box for the further processing of the powder. The fine powder 20 can be transferred from the collection pot 9 by inverting it and opening the valve 37. Gravity can move the powder 20.

While the reaction apparatus 7 and detachable container 9 protect the fine powder 20 during the powder manufacture, at some point, the fine powder 20 must be removed from the detachable container or collection pot 9 for further processing and/or in preparation for specific production processes. Although such operations could be performed in an inert atmosphere, for example in a glove box, it would be less expensive and much simpler if the fine powder 20 were be passivated for handling in air. Any matter that, with or without chemical reaction, retards the potentials of said solidified fine powders 20 to ignite or explode without contaminating the solidified fine powders in such a way as to limit their utility as raw material in specific powder production processes, will work in the invention. We have found that the addition of 1–4% of a neutralizing liquid coating, such as mineral oil, to the fine powder 20 achieves that purpose. The neutralizing liquid coating can be added directly, or it can be added by suspending it in a carrier liquid, which can be removed later in the process. The powder 20 can also be passivated through the metered feed of a small, controlled amount of oxygen to react with the fine powder 20 surfaces in an inert atmosphere during additional processing e.g., sieving/classifying or packaging).

Some non-limiting examples of fine powders 20 that have been produced in experiments using the method of the instant invention will be discussed below. In these all of the examples, titanium powder enriched with hydrogen with the chemical composition shown below in Table 1 was used.

TABLE 1

| Element | Percent | Elements) | Percent |
|---------|---------|-----------|---------|
| Oxygen | <0.20 | Iron | <0.05 |
| Hydrogen | 3.80 | Silicon | <0.01 |
| Nitrogen | <0.02 | Chlorine | <0.01 |
| Carbon | <0.04 | Calcium/Magnesium/Sodium | <0.01 |

Examples one, two, and four, described below, used coarse feed powders or particles classified to greater than 45 micrometers but less than −75 micrometers. Example 3 used feed powder that was all under 45 micrometers While the examples are specific in the details of the procedures, there are a wide range of conditions e.g., type of matter, type of gas, gas percentage content, particle size, particle feed/flow rates, current amperage/voltage, etc.) that would be suitable for producing fine powder for specific purposes using the invention. In all of the examples, the fine powder product was spherical because of the processing conditions. The described examples are not meant to limit the combinations of process conditions that can be used to produce fine powder according to the invention.

EXAMPLE ONE

The hydrogen-enriched titanium was loaded into the powder feed hopper 1 of the system 34 as described above and shown in FIG. 4. The entire system 34 was then purged for one hour with pure argon. Subsequently, the hydrogen-enriched titanium coarse feed powder was fed through the hot plasma flame 19 that is more clearly seen in FIG. 2. Argon gas was fed to the powder feed hopper 1 at a rate of 10 cubic feet/hour to assist in feeding the coarse powder 2 to the arc plasma 3. The feed rate of gas-enriched coarse particles 2 was 4 pounds/hour. The plasma current was 600 amps at 40 volts. The plasma gas was pure argon at a flow rate of 50 cubic feet/minute. Argon gas was fed to the reaction chamber 7 at a rate of 100 cubic feet/hour to protect the hot fine spherical powder particles and to sweep the sight glass of attached particles. A flow of argon to the collection pot 9 attached to the bottom of the reaction chamber 7 was maintained at 20 cubic feet/hour for further protection of the powder. The entire system 34 of powder feeder 1, plasma flame 19, reaction chamber 7, and collection pot 9 was tightly connected and sealed to prevent contamination from oxygen, nitrogen, and water vapor from the outside atmosphere. The fine spherical powder exiting the torch was cooled and solidified in-flight interior of the reaction chamber 7, and gravity brought it to the collection pot.

After running the coarse hydrogen-enriched titanium powder 2 through the plasma torch for 10 minutes, the fine spherical powder 20 produced was transferred from the collection pot 9 to a glove box, under argon, where a small sample was examined under a microscope. The particle size of the product powder 20 was generally under 10 micrometers and almost all of the particles were under 20 micrometers. The particles 20 were generally spherical or spheroidal in shape, although some irregular shapes were present.

The balance of the fine spherical powder 20 was passivated by coating it with mineral oil in a 1% ratio to the fine spherical powders by weight. A uniform coating of mineral oil on the surfaces of the fine particles was promoted by dissolving the mineral oil in heptane and then suspending the fine titanium in the solution, while evaporating the heptane by heating and stirring continuously until essentially only the mineral oil remained as a coating on the particles. The fine powder 20 thus processed could be exposed to air without ignition. Particles 20 not treated as described could not be exposed to air without spontaneous ignition occurring.

EXAMPLE TWO

The process or method of Example One was followed and applied to the same type of coarse feed powder 2, except that the electrical power to the plasma torch was raised to 700 amps to increase the flame temperature. The fine spherical powder 20 which was produced in this case was observed to contain a greater number of significantly smaller particles then the fine spherical powder produced in Example One. Almost all the particles 20 appeared to be under 10 micrometers, and most were under 5 micrometers. The powder 20 was passivated by coating it with mineral oil in a 4% ratio by weight, as described in Example One.

EXAMPLE THREE

The process or method of Example One followed and was applied to a gas enriched titanium feed powder, which was all, less than 45 micrometers. The resulting spherical powder 20 was observed to be finer than the powder of Example One, but somewhat coarser than that of Example Two. We believe the particle size difference is the result of the finer powder 20 being heated more rapidly to the point where the hydrogen is released. Subsequently, the fine powder 20 was passivated by coating it with mineral oil in a 4% ratio by weight, as described in Example One.

EXAMPLE FOUR

The process or method of Example I was again applied to the same type of coarse feed powder 2 as Example One, after it had been heated at a temperature of about 850 Celsius to lower the hydrogen content to 0.5%. The resulting powder 20 was mostly between 20 and 40 micrometers, indicating that the lower gas level resulted in a coarser product particle size.

Reference Numbers

1 Powder Feeder
2 Feed Powder
3 Heat Source
4 Pressure Relief Valve
5 Pressure Gauge
6 Top (Reaction Chamber)
7 Reaction Chamber
8 Dust Collection
9 Collection Pot
10 Quick Disconnect Flange Assembly
11 Steel Frame
12 Gas Port (Argon Gas)
13 Copper Electrode 14 Powder Feed Line
15 Tungsten Electrode
16 Electric Power Connections
17 Cooling Water Connection
18 Electrical Arc
19 Plasma Flame
20 Reacted Or Fine Powder
21 Nonconductive Body
22 Copper Nozzle Orifice (Plasma Flame)
24 Argon Or Other Gas Or Gases
25 Coil
26 Non-Conducting Ceramic Cylinder
27 Copper Tubing
28 Downstream Plasma Gases
29 Plasma (Induction Plasma Torch)
30 High-Frequency (Rf) Induction Current
31 Water
32 Hot Core Or Zone
34 Plasma Reactor System
35 Gas Inlet Valve
36 Gas Outlet Valve
37 Butterfly Valve

FIGS.

1A Hydrogen-Containing Powder Particles Prior To Plasma Melting
1B Powder Particles After Melting
2 Non-Transferred-Arc Plasma Torch
3 Induction Plasma Torch
4 Plasma Reactor System
5 Stainless Steel Collection Pot

What is claimed:

1. A method for producing ceramic powders from feed powders including the steps of:
   a) providing a selected quantity of feed powders, said feed powders having a predetermined coarseness while simultaneously being gas enriched;
   b) shattering the feed powders into fine powders by rapidly heating the feed powders to at least a temperature in the vicinity of the feed powders melting temperature so that the gas expands and is released explosively; and
   c) collecting the fine powders in a protective atmosphere.

2. A method for producing fine powders as recited in claim 1 which includes the further step of feeding the feed powders at a selected rate into a chamber that is capable of rapidly heating the feed powders.

3. A method for producing fine powders as recited in claim 2 which includes the further step of passivating the fine powders by coating the fine powders with a neutralizing solution.

4. A method for producing fine powders as recited in claim 3 wherein the chamber is a reaction chamber that is heated with a plasma flame.

5. A method for producing fine powders as recited in claim 4 wherein the plasma flame is produced by an arc plasma torch.

6. A method for producing fine powders as recited in claim 4 wherein the plasma flame is produced by an induction plasma torch.

7. A method for producing fine powders as recited in claim 6 which includes the further step of feeding the feed powders co-axially with a plasma gas for the induction plasma torch.

8. A method for producing fine powders as recited in claim 2 wherein a majority of the fine powders being collected are spheroid in shape.

9. A method for producing fine powders as recited in claim 2 wherein the chamber is a reaction chamber that is heated with a plasma flame.

10. A method for producing fine powders as recited in claim 9 wherein the plasma flame is produced by an arc plasma torch.

11. A method for producing fine powders as recited in claim 9 wherein the plasma flame is produced by an induction plasma torch.

12. A method for producing fine powders as recited in claim 11 which includes the further step of feeding the feed powders co-axially with a plasma gas for the induction plasma torch.

13. A method for producing fine powders as recited in claim 1 which includes the further step of passivating the fine powders by coating the fine powders with a neutralizing solution.

14. A method for producing fine powders as recited in claim 13 wherein a majority of the fine powders being collected are spheroid in shape.

15. A method for producing fine powders as recited in claim 1 wherein a majority of the fine powders being collected are spheroid in shape.

16. A method for producing fine powders as recited in claim 1 wherein the feed powders are gas enriched with hydrogen.

17. A method as recited in claim 1 which includes the further step of minimizing the contamination of feed powders and the fine powders by first suspending the feed powders in a flow of a plasma gas of a plasma flame of a reaction chamber and subsequently continuing suspension of the fine powders in the flow of the plasma gas during solidification and cooling of the fine powders during the collection thereof.

18. A method as recited in claim 1 wherein an electron beam is employed for the rapidly heating of the feed powders to at least the temperature in the vicinity of their melting temperature.

19. A method as recited in claim 1 wherein a laser beam is employed for the rapidly heating of the feed powders to at least the temperature in the vicinity of their melting temperature.

20. A method for producing fine ceramic powders from feed powders including the steps of:
   a) providing a high temperature reaction chamber; said reaction chamber being gas tight and having a feeding port for introducing a predetermined quantity of feed powder into the high temperature reaction chamber, said feed powder being of a predetermined coarseness while simultaneously being gas enriched;
   b) providing a means for heating a hot zone of said high temperature reaction chamber;
   c) providing a collection pot that is removably attached to an outlet port of the high temperature reaction chamber by a gas tight coupling; and
   d) wherein the feed powders are shattered into fine powders by rapidly heating the feed powders in the interior of the high temperature reaction chamber and within the hot zone to a temperature in the vicinity of their melting temperature so that gas expands and is released explosively; and subsequently collecting the fine powders in the collection pot.

21. A method for producing fine powders as recited in claim 20 which includes the further step of: flushing an interior of the high temperature reaction chamber and the collection pot attached thereto with a selected gas prior to the introducing the quantity of feed powders into the high temperature reaction chamber for minimizing the presence of contaminants therein.

22. A method for producing fine powders as recited in claim 21 which includes the further step of: placing a supply of the feed powder in a powder feeder that is in fluid communication with the feeding port and then simultaneously and uniformly entraining the feed powder in a stream of a selected gas while the feed powder is being introduced at a selected rate into the feeding port of the high temperature reaction chamber.

23. A method for producing fine powders as recited in claim 22 which includes the further step of neutralizing the fine powder in the collection pot.

24. A method for producing fine powders as recited in claim 22 wherein walls of the high temperature reaction chamber are made of a non-conducting ceramic material.

25. A method for producing fine powders as recited in claim 24 wherein the interior walls of the high temperature reaction chamber are cooled by a water jacket for withstanding the temperature in the vicinity of the melting temperature.

26. A method for producing fine powders as recited in claim 21 which includes the further step of neutralizing the fine powder in the collection pot.

27. A method for producing fine powders as recited in claim 21 wherein walls of the high temperature reaction chamber are made of a non-conducting ceramic material.

28. A method for producing fine powders as recited in claim 27 wherein interior walls of the high temperature reaction chamber are cooled by a water jacket for withstanding the temperature in the vicinity melting temperature.

29. A method as recited in claim 21 wherein the means for heating is a plasma flame that is introduced through the feeding port.

30. A method as recited in claim 29 wherein the high temperature reaction chamber further includes a vent port that is connected to a dust collector by and with a vent duct for removing effluent from the plasma flame, said dust collector being regulated for removing said effluent absent placing a negative pressure on the high temperature reaction chamber.

31. A method for producing fine powders as recited in claim 20 which includes the further step of: placing a supply of the feed powder in a powder feeder that is in fluid communication with the feeding port and then simultaneously and uniformly entraining the feed powder in a stream of a selected gas while the feed powder is being introduced at a selected rate into the feeding port of the high temperature reaction chamber.

32. A method for producing fine powders as recited in claim 31 which includes the further step of neutralizing the fine powder in the collection pot.

33. A method for producing fine powders as recited in claim 31 wherein walls of the high temperature reaction chamber are made of a non-conducting ceramic material.

34. A method for producing fine powders as recited in claim 33 wherein the interior walls of the high temperature reaction chamber are cooled by a water jacket for withstanding the temperature in the vicinity of the melting temperature.

35. A method as recited in claim 31 wherein the means for heating is a plasma flame that is introduced through the feeding port.

36. A method as recited in claim 35 wherein the high temperature reaction chamber further includes a vent port that is connected to a dust collector by and with a vent duct for removing effluent from the plasma flame, said dust collector being regulated for removing said effluent absent placing a negative pressure on the high temperature reaction chamber.

37. A method for producing fine powders as recited in claim 20 which includes the further step of neutralizing the fine powders in the collection pot.

38. A method for producing fine powders as recited in claim 20 wherein walls of the high temperature reaction chamber are made of a non-conducting ceramic material.

39. A method for producing fine powders as recited in claim 38 wherein the interior walls of the high temperature reaction chamber are cooled by a water jacket for withstanding the temperature in the vicinity of the melting temperature.

40. A method as recited in claim 20 wherein the means for heating is a plasma flame that is introduced through the feeding port.

41. A method as recited in claim 40 wherein the high temperature reaction chamber further includes a vent port that is connected to a dust collector by and with a vent duct for removing effluent from the plasma flame, said dust collector being regulated for removing said effluent absent placing a negative pressure on the high temperature reaction chamber.

42. A method as recited in claim 20 wherein the high temperature reaction chamber further includes a vent port that is connected to a dust collector by and with a vent duct for removing effluent from the means for heating, said dust collector being regulated for removing said effluent absent placing a negative pressure on the high temperature reaction chamber.

* * * * *